United States Patent
Kusase

(10) Patent No.: US 9,143,024 B2
(45) Date of Patent: Sep. 22, 2015

(54) DOUBLE-STATOR MOTOR HAVING VARIOUS CONFIGURATIONS FOR INNER AND OUTER WINDINGS

(71) Applicant: DENSO CORPORATION, Kariya, Aichi-pref. (JP)

(72) Inventor: Shin Kusase, Obu (JP)

(73) Assignee: DENSO CORPORATION, Kariya (JP)

(*) Notice: Subject to any disclaimer, the term of this patent is extended or adjusted under 35 U.S.C. 154(b) by 459 days.

(21) Appl. No.: 13/656,990

(22) Filed: Oct. 22, 2012

(65) Prior Publication Data

US 2013/0099618 A1    Apr. 25, 2013

(30) Foreign Application Priority Data

Oct. 21, 2011 (JP) ................... 2011-231635

(51) Int. Cl.
*H02K 16/04* (2006.01)
*H02K 3/28* (2006.01)
(Continued)

(52) U.S. Cl.
CPC .............. *H02K 16/04* (2013.01); *H02K 1/276* (2013.01); *H02K 1/2786* (2013.01); *H02K 3/28* (2013.01); *H02K 21/14* (2013.01); *H02K 21/22* (2013.01);
(Continued)

(58) Field of Classification Search
CPC .......... H02K 3/50; H02K 3/505; H02K 3/52; H02K 3/521; H02K 3/522; H02K 16/04; H02K 21/12; H02K 23/36
USPC ............ 310/156.35, 184, 189, 200, 201, 207, 310/216.029
See application file for complete search history.

(56) References Cited

U.S. PATENT DOCUMENTS 5,345,133 A    9/1994    Satake
6,093,992 A    7/2000    Akemakou
(Continued)

FOREIGN PATENT DOCUMENTS

CN    1215241    4/1999
JP    61-141976    9/1986
(Continued)

OTHER PUBLICATIONS

Kawasaki et al., English Translation of JP 2002-335658, Nov. 2002.*

(Continued)

*Primary Examiner* — Terrance Kenerly
*Assistant Examiner* — Rashad Johnson
(74) *Attorney, Agent, or Firm* — Nixon & Vanderhye PC

(57) ABSTRACT

A double-stator motor of an example embodiment includes: an annular rotor connected to a rotary shaft and integrally rotates with the rotary shaft, an inner stator arranged radially inward of the rotor, and an outer stator arranged radially outward of the rotor. The rotor includes a plurality of segments annularly arranged in the circumferential direction, spaced apart from each other by a predetermined distance, and a plurality of permanent magnets each interposed between circumferentially adjacent segments, the permanent magnets being alternately magnetized in the circumferentially opposite direction. The rotor, the inner stator and the outer stator have the same number of poles. The inner and outer stator windings of the inner and outer stators, respectively, are connected so that their phases are reversed to each other. Thus, the magnetic fields generated by the magnetomotive forces of the inner and outer stators are applied to specific segments in parallel.

16 Claims, 17 Drawing Sheets

(51) Int. Cl.
*H02K 21/14* (2006.01)
*H02K 21/22* (2006.01)
*H02K 1/27* (2006.01)
H02K 3/50 (2006.01)
H02K 23/36 (2006.01)
H02K 3/52 (2006.01)

(52) U.S. Cl.
CPC *H02K 3/50* (2013.01); *H02K 3/505* (2013.01); *H02K 3/52* (2013.01); *H02K 3/521* (2013.01); *H02K 3/522* (2013.01); *H02K 23/36* (2013.01)

(56) References Cited

U.S. PATENT DOCUMENTS

| | | | |
|---|---|---|---|
| 6,459,185 B1 * | 10/2002 | Ehrhart et al. | 310/156.45 |
| 7,791,245 B1 * | 9/2010 | Hao et al. | 310/266 |
| 7,999,431 B2 * | 8/2011 | Dooley et al. | 310/184 |
| 2010/0139999 A1 * | 6/2010 | Park | 180/65.51 |
| 2011/0285238 A1 * | 11/2011 | Kusase et al. | 310/156.48 |

FOREIGN PATENT DOCUMENTS

| | | |
|---|---|---|
| JP | 3-139156 | 6/1991 |
| JP | 05-344698 | 12/1993 |
| JP | 11-164536 | 6/1999 |
| JP | 2002335658 A * | 11/2002 |
| JP | 2003-309957 | 10/2003 |

OTHER PUBLICATIONS

Office Action (2 pgs.) dated May 27 2014 issued in corresponding Japanese AppLication No. 2013-215977 with an at least partial Translation thereof (3 pgs.).

Office Action (3 pages) dated Aug. 20, 2013, issued in corresponding Japanese Application No. 2011-231635 and English translation (4 pages).

Office Action (6 pgs.) dated Sep. 2, 2014 issued in corresponding Chinese Application No. 201210401521.9 and English translation (8 pgs.).

* cited by examiner

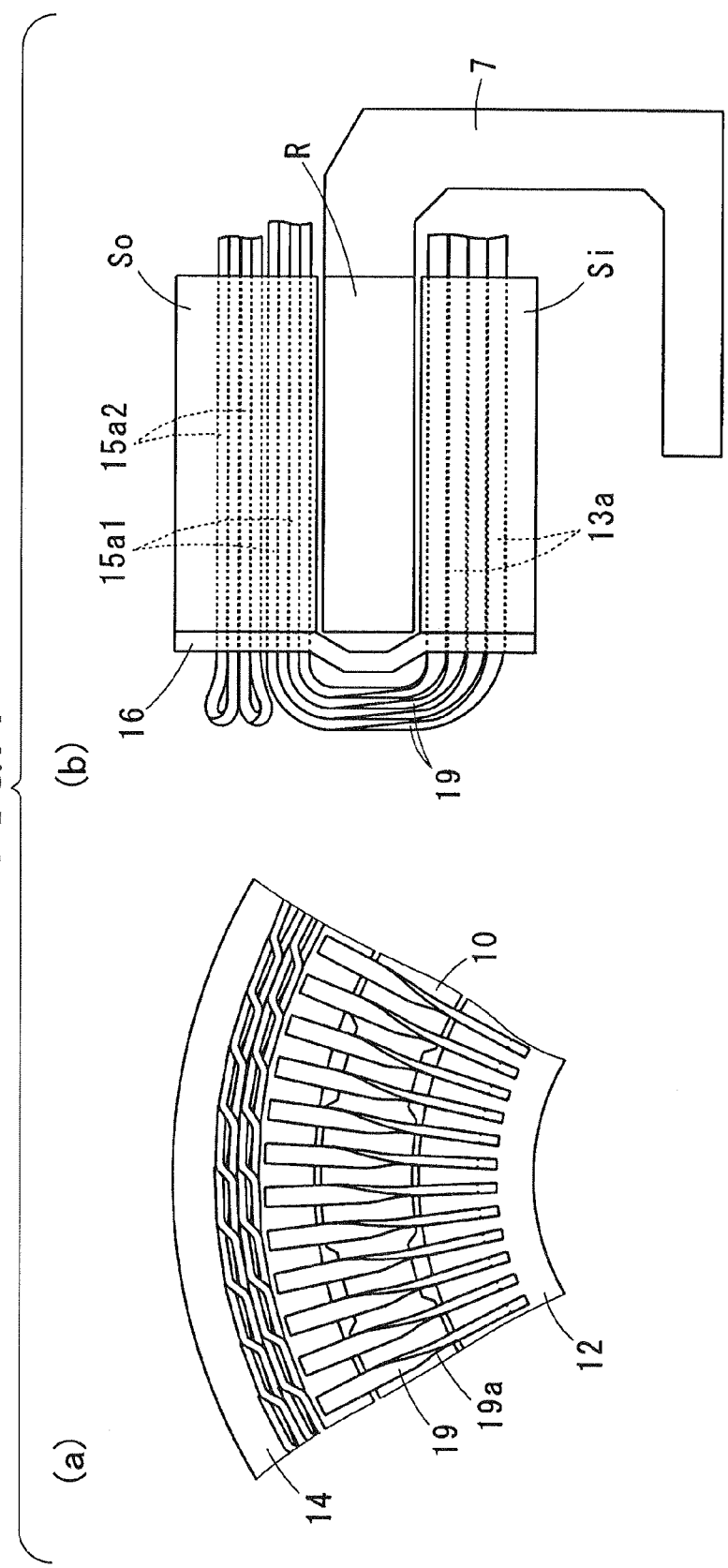

FIG.5

| SPECS \ MODELS | MODEL A | MODEL B | MODEL C | MODEL D |
|---|---|---|---|---|
| NUMBER OF POLES | 12 | 12 | 12 | 12 |
| CORE-STACK THICKNESS | 95 | 95 | 95 | 95 |
| CORE MATERIAL | 35H250 | 35H250 | 35H250 | 35H250 |
| MAGNET MATERIAL | FB14H | FB14H | FB14H | FB14H |
| AMOUNT OF MAGNET PER POLE (cm^3) | 12.3 | 12.3 | 12.3 | 12.3 |
| MAGNET THICKNESS (mm), (PER POLE) | ABOUT 1.8 TO 3 | 9 | 9 | 9 |
| OUTER/INNER DIAMETER OF OUTER STATOR (mm) | $\phi$180/ $\phi$137 | $\phi$180/ $\phi$137 | $\phi$180/ $\phi$146 | $\phi$180/ $\phi$137 |
| OUTER/INNER DIAMETER OF ROTOR (mm) | $\phi$136/ $\phi$70 | $\phi$136/ $\phi$70 | $\phi$145/ $\phi$115 | $\phi$136/ $\phi$106 |
| OUTER/INNER DIAMETER OF INNER STATOR (mm) | – | – | $\phi$114/ $\phi$70 | $\phi$105/ $\phi$70 |
| NUMBER OF TURNS PER POLE PER PHASE | 8T | 8T | OUTER STATOR/ INNER STATOR : 6T/6T | OUTER STATOR/ INNER STATOR : 8T/4T |
| SHAPE AND CROSS-SECTIONAL AREA OF SLOT (mm^2) | 13*3=39 | 13*3=39 | OUTER STATOR : 9.7*3=29.1 / INNER STATOR : 9.7*3=29.1 | OUTER STATOR : 13.3*3=39 / INNER STATOR : 6.5*3=19.5 |
| MINIMUM WIDTH OF STATOR TOOTH | 3 | 3 | OUTER STATOR : 3.5 INNER STATOR : 1 | OUTER STATOR : 3 INNER STATOR : 2 |

FIG.6
(a) MODEL A
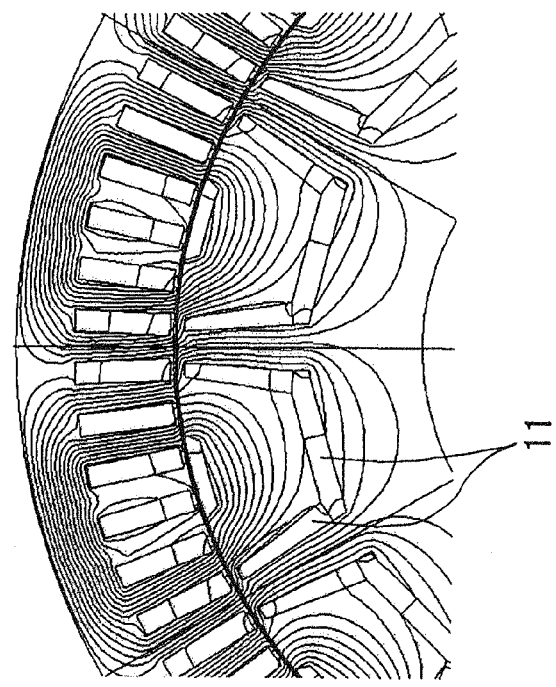
(b)
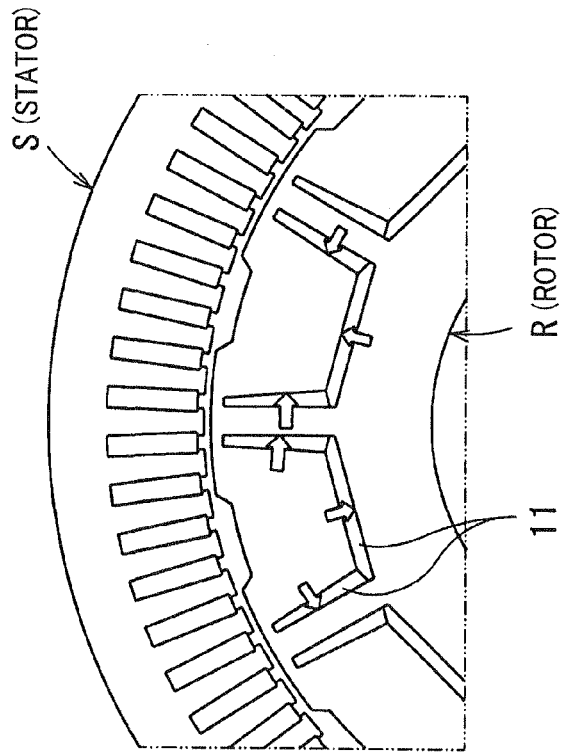

FIG.7
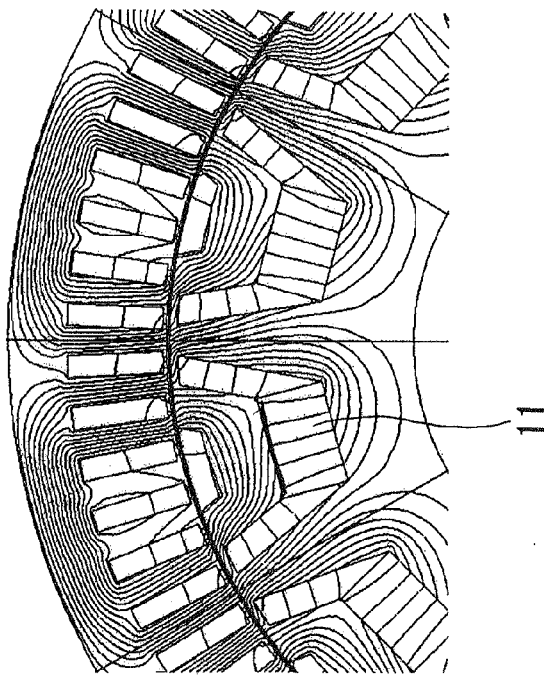
(a) MODEL B
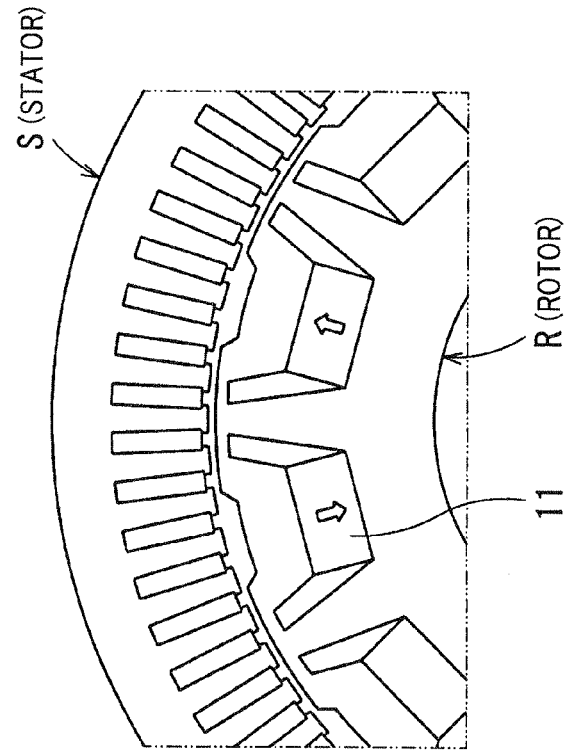
(b)

FIG.9
(a) MODEL D 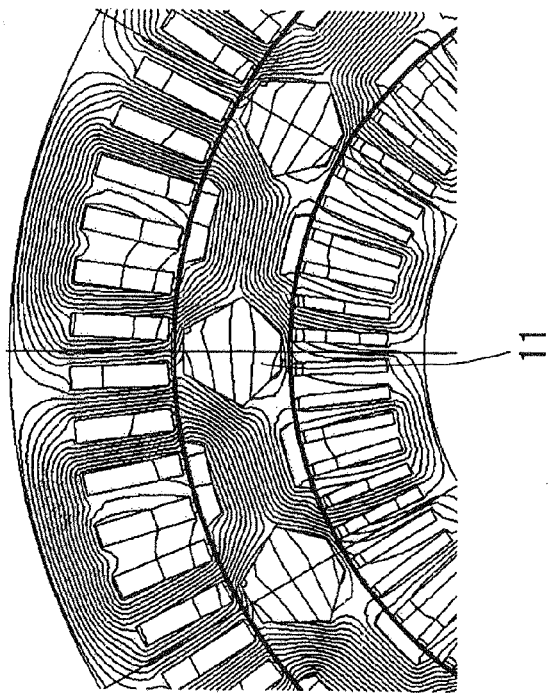
(b) 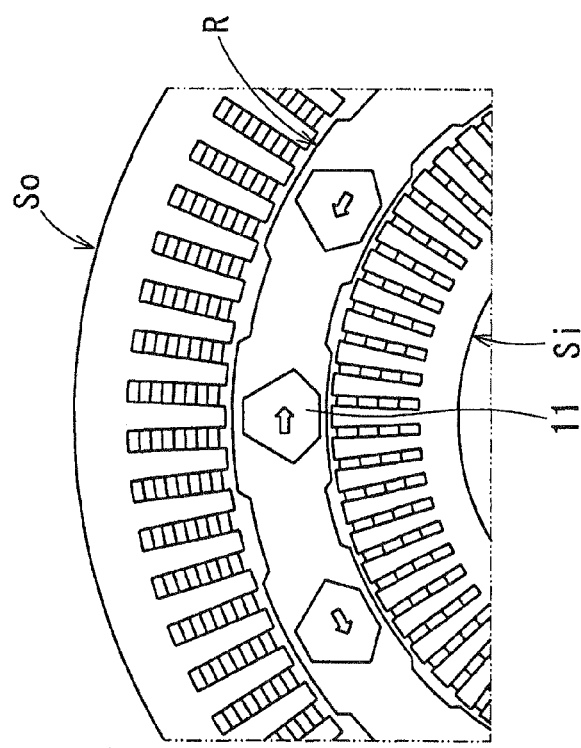

FIG.15
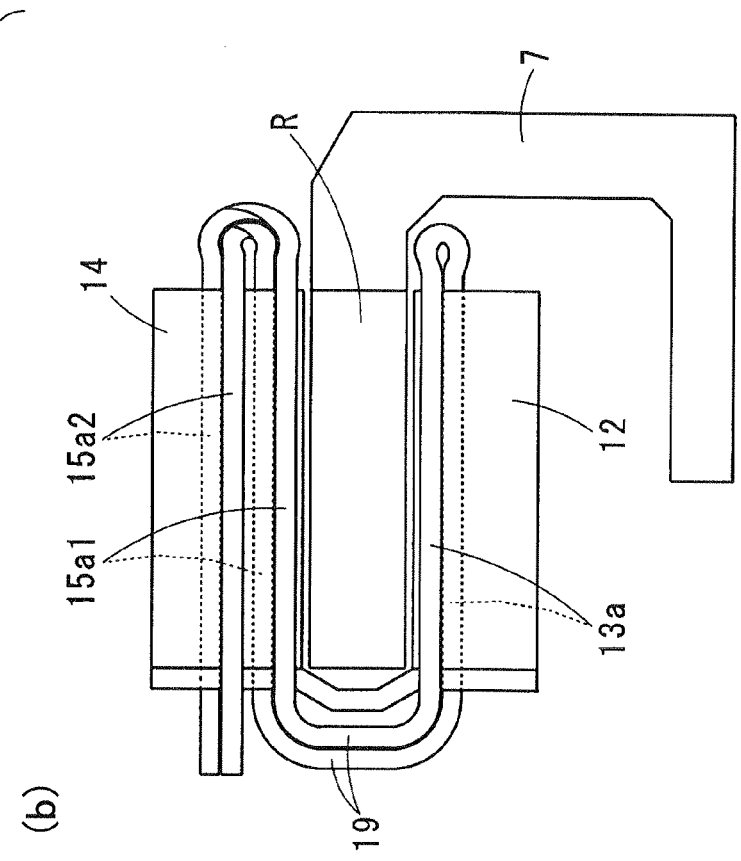
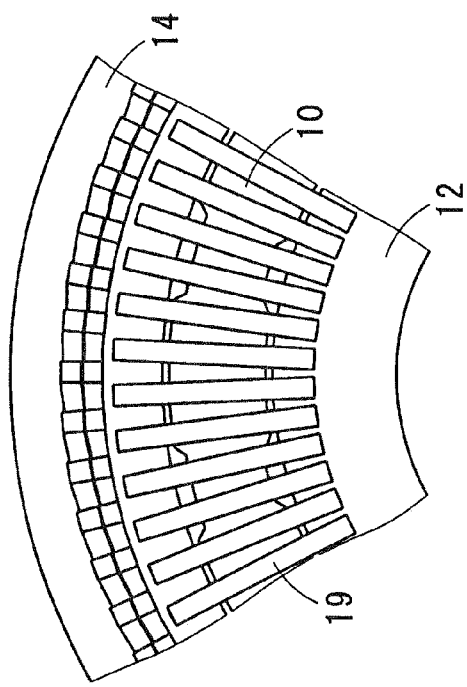

DOUBLE-STATOR MOTOR HAVING VARIOUS CONFIGURATIONS FOR INNER AND OUTER WINDINGS

CROSS-REFERENCE TO RELATED APPLICATION

This application is based on and claims the benefit of priority from earlier Japanese Patent Application No. 2011-231635 filed Oct. 21, 2011, the description of which is incorporated herein by reference.

BACKGROUND OF THE INVENTION

1. Technical Field of the Invention

The present invention relates to the structure of a motor that can employ magnets, such as ferrite magnets, having a tendency of demagnetization, and in particular to a double-stator motor that includes an annular rotor in which circumferentially magnetized permanent magnets are individually sandwiched between segment poles, and inner and outer three-phase stators which are arranged radially inside and outside, respectively, of the rotor.

2. Related Art

Mainstream motors in recent years are synchronous motors embedding neodymium magnets as permanent magnets. For such neodymium magnets, a heavy rare earth metal, such as dysprosium, is indispensable as an additive material. However, with the soaring prices of heavy rare earth metal, future use of such rare-earth magnets, when applied to mass-produced motors, will face a risk of not being suitable for mass production. Accordingly, for the departure from using rare-earth motors, research and development are accelerated for the production of motors which use magnets made of ferrite that is a readily-available material.

However, ferrite magnets have characteristics inferior to neodymium magnets in that the magnetic flux density and the coercive force are only a fraction of the neodymium magnets. Thus, the technical issue at the moment is how the magnets having such inferior characteristics are proficiently used.

In a synchronous motor embedding permanent magnets, replacement of the neodymium magnets that are embedded in the motor with ferrite magnets will deteriorate the output characteristics in accordance with the low magnetic flux density of the ferrite magnets. The deterioration may be accepted by compromise but may raise a problem. The problem is that, having only a small coercive force, the ferrite magnets are not able to withstand the large magnetomotive force of the stator windings, unlike the neodymium magnets. Accordingly, the ferrite magnets are permanently demagnetized, allowing the motor to lose its functions. In order to take measures against the problem of demagnetization of the ferrite magnets, a system or a structure is sought for, which allows less magnetomotive force from the stator windings to be applied to the magnets or which reduces the magnetomotive force of the stator windings.

For the problem set forth above, the structure of a double-stator motor disclosed in JP-A-H03-139156 is referred to, which structure may be informative to solve the problem. Specifically, the magnetomotive forces of the stators as the sources of the magnetomotive forces applied to the permanent magnets may be reduced to a half by providing a structure that divides the magnetomotive forces into two, i.e. inner and outer forces.

However, well-known double-stator motors suffer from the problems as set forth below under items (1) to (3).

(1) Due to the double structure (double stator), the number of components of the stator is doubled. In particular, the number of the stator windings requiring a complicated manufacturing process becomes two times that previously. Therefore it is difficult to manufacture double-stator motors.

(2) Due to the double structure, a good relationship between an inner stator's winding space and that core's cross-sectional area is hardly established. In other words, since a magnetic path of the inner stator's core becomes narrow, it is difficult to exert the characteristics as a double-stator motor.

(3) The magnets are arranged so as to be magnetized in the radial direction of the rotor, while the magnetomotive forces of the inner and outer stators are configured to cooperate with each other and unidirectionally work on the magnets. Therefore, demagnetization of the magnets cannot be reduced.

Because of these problems, use of the system disclosed in JP-A-H03-139156 as it is does not lead to practical realization of a double-stator motor having ferrite magnets. Moreover, even though the disclosed system is used as it is, no effect of reducing demagnetization can be expected.

SUMMARY

Accordingly, such a double-stator motor as can use ferrite magnets which have a tendency of demagnetization and can be easily manufactured in comparison with the conventional motor as disclosed in JP-A-H03-139156 is desired.

Hence, the present application provides, as the exemplary embodiment, a double-stator motor having a configuration as set forth below. Specifically, the double-stator motor includes an annular rotor connected to a rotary shaft and integrally rotates with the rotary shaft, an inner stator arranged radially inward of the rotor, and an outer stator arranged radially outward of the rotor. The rotor includes a plurality of segments annularly arranged in the circumferential direction, being spaced apart from each other by a predetermined distance, and a plurality of permanent magnets each being interposed between circumferentially adjacent segments, the permanent magnets being alternately magnetized in the circumferentially opposite direction.

The inner stator includes an inner stator core having a plurality of slots which are open in an outer periphery thereof, and a three-phase inner stator winding wound about the inner stator core through the plurality of slots. The outer stator includes an outer stator core having a plurality of slots which are open in an inner periphery thereof, and a three-phase outer stator winding wound about the outer stator core through the plurality of slots. The rotor, the inner stator and the outer stator have the same number of poles. The inner and outer stator windings of the inner and outer stators, respectively, are connected so that their phases are reversed to each other. Thus, the magnetic fields generated by the magnetomotive forces of the inner and outer stators are applied to specific segments in parallel (first aspect of the present invention).

According to this configuration, the magnetomotive force from the winding of the inner stator and the outer stator will not be cooperatively applied in the same direction to the specific segments but reversely applied to the specific segments. Accordingly, the magnetomotive forces of the stators applied to the magnets are diffused and reduced. Further, the permanent magnets will have a polarity of being magnetized in the circumferential direction instead of being magnetized toward the stators (in the radial direction). Accordingly, the demagnetizing fields of the stators applied to the magnetizing direction of the magnets are greatly reduced. On the basis of the synergetic effect of the both action mentioned above, an effect of hardly allowing demagnetization of the magnets further can be exerted. Accordingly, such magnets as ferrite magnets having a tendency of demagnetization can be used for the double-stator motor.

The number of slots of the inner stator core of the inner stator may be equal to the number of slots of the outer stator core of the outer stator. Further, the inner and outer stator windings may have their in-slot conductors that are accommodated in the slots. The number of in-slot conductors of the inner stator winding may be smaller than the number of in-slot conductors of the outer stator winding (second aspect of the present invention). According to this configuration, while the outer and inner stator cores have the same number of slots, the number of in-slot conductors accommodated in each slot is smaller in the inner stator winding than in the outer stator winding. Accordingly, the cross-sectional area of each slot can be made smaller in the inner stator core than in the outer stator core. Thus, for example, when a motor is desired to have a small diameter, the inner stator core, as a passage of magnetic flux, will be ensured to have a sufficiently large cross-sectional area by allowing the inner stator core to have the slots of a small cross-sectional area. Thus, under constraints on the diameter difference between the inner stator and the outer stator, the inner stator may be easily designed to be smaller than the outer stator.

Instead of the second aspect, the number of slots of the inner stator core may be smaller than the number of slots of the outer stator core (third aspect of the present invention). According to this configuration, the inner stator core may have a relatively large slot pitch in comparison with the outer stator core. Accordingly, for example, even if a motor is desired to have a small diameter, the inner stator's cross-sectional area corresponding to a magnetic flux passage can be sufficiently secured by allowing the inner stator core to have a large slot pitch. Thus, under constraints on the diameter difference between the inner stator and the outer stator, the inner stator may be easily designed to be smaller than the outer stator.

The in-slot conductors of the outer stator winding may include inner in-slot conductors that are accommodated in the slots on an inner-peripheral side thereof and outer in-slot conductors that are accommodated in the slots on an outer-peripheral side thereof, or in other words, accommodated outside the inner in-slot conductors. Further, the inner in-slot conductors of the outer stator winding and the in-slot conductors of the inner stator winding are continuously and integrally provided, forming a U-shape, via respective bridges that are arranged so as to radially bridge between the inner and outer stators on one axial end side of the rotor (fourth aspect of the present invention).

According to this configuration, the inner in-slot conductors of the outer stator winding and that of the inner stator winding are integrally formed by bridges. Accordingly, one can achieve cost reduction for manufacturing the motor by reducing the number of conductors used in the inner and outer stator windings. Further, the inner in-slot conductors of the outer stator winding and that of the inner stator winding which are configured in a U-shape via bridges can be inserted into each slot disposed for the outer stator core and inner stator core from an axial direction, thereby assembled. Then, the end of the side not connected by the bridge may be connected each other, e.g. by means of welding at predetermined positions after being hexagonally bent. Thus, both the inner in-slot conductors of the outer stator winding and that of the inner stator winding are easily assembled into the inner stator cores and outer stator cores, and additionally exerting an effect of improving the space factor of the slots.

In the outer stator winding, one and the other of the outer in-slot conductors that are accommodated in two circumferentially different slots of the outer stator core may be continuously and integrally provided, forming a U-shape outside an axial end face of the outer stator core. Further, the inner and outer in-slot conductors of the outer stator winding may be electrically and mechanically connected on an axial end side opposite to the U-shaped side (fifth aspect of the present invention).

In this configuration, an outer in-slot conductor is integrally connected, on one axial end side, to another outer in-slot conductor, forming a U-shape. Accordingly, the number of conductors used in the inner and outer stator windings is reduced. Thus, the number of components is reduced to thereby reduce the cost for manufacturing the motor. An outer in-slot conductor and another outer in-slot conductor integrally connected to each other forming a U-shape on an axial end side are inserted and assembled into the outer stator core in the axial direction for accommodation in the slots. Then, the axial ends of the in-slot conductors on the side opposite to the U-shaped side, may be connected to each other (joined to each other such as by welding at predetermined positions, after being hexagonally bent). Thus, the in-slot conductors are easily assembled into the outer stator core, additionally exerting an effect of improving the space factor of the slots.

In the inner and outer stator windings, the in-slot conductors may each have a rectangular cross section and may have the same cross-sectional area. Further, the in-slot conductors of the inner stator winding may be accommodated in each slot so that the long sides of each rectangular cross section are directed in the radial direction of the inner stator core, and the in-slot conductors of the outer stator winding may be accommodated in each slot so that the long sides of each rectangular cross section are directed in the circumferential direction of the outer stator core. Furthermore, the bridges may each have the same cross-sectional shape and the same cross-sectional area as those of each of the in-slot conductors and may each be twisted by 90 degrees (sixth aspect of the present invention).

In this configuration, the in-slot conductors of the inner stator winding are arranged lengthwise, i.e. arranged with the long sides of the rectangular cross section of each conductor being directed to the radial direction. Accordingly, the slots of the inner stator core can each be formed with a small width (width in the circumferential direction). Thus, each tooth, as a magnetic flux passage, formed between the slots circumferentially adjacent in the inner stator core will have a larger cross-sectional area perpendicular to the axial direction. The increase in the cross-sectional area of each tooth exerts an effect of enhancing the performance of a small-diameter motor in particular.

In the inner and outer stator windings, the in-slot conductors may each have a rectangular cross section and may have the same cross-sectional area. Further, the outer in-slot conductors of the outer stator winding may be accommodated in each slot so that the long sides of the rectangular cross section are directed to the circumferential direction of the outer stator core, and the inner in-slot conductors of the outer stator winding may be accommodated in each slot so that the long sides of the rectangular cross section are directed to the radial direction of the outer stator core. Furthermore, the in-slot conductors of the inner stator winding may be accommodated in each slot so that the long sides of the rectangular cross section are directed to the radial direction of the inner stator core (seventh aspect of the present invention). In this configuration, a lengthwise arrangement, i.e. an arrangement in which the long sides of the rectangular cross section are directed to the radial direction, is used for the inner in-slot conductors of the outer stator winding and the in-slot conductors of the inner stator winding connected via the respective bridges. Accordingly, the bridges are not required to be twisted by 90 degrees. In other words, the effects similar to those of the sixth aspect of the present invention are exerted without performing the process of twisting the bridges by 90 degrees. Thus, the number of steps is reduced in manufacturing the motor.

In the inner and outer stator windings, the in-slot conductors of the inner stator winding may be connected to respective inner in-slot conductors of the outer stator winding via respective bridges, forming a U-shape on one axial end side. Further, the inner and outer in-slot conductors of the outer stator winding may be connected by forming a U-shape on the other axial end side, thereby form serial windings like a serpentine shape. A plurality of the serial windings may form one-phase of winding component as a whole (eighth aspect of the present invention). In this configuration, the in-slot conductors of the inner stator winding are connected to the respective inner in-slot conductors of the outer stator winding, which are further connected to the respective outer in-slot conductors of the outer stator winding, forming an integrated continuous serpentine body of a winding component. Accordingly, the inner and outer stator windings can be applied to the stator cores using a small number of such winding components. Further, each continuous winding component formed into the serpentine shape can be accommodated, as it is, with one stroke into the slots of the inner and outer stator cores. This may contribute to reducing the number of steps and the time for assembling the in-slot conductors of the inner and outer stator windings into the inner and outer stator cores.

Each of the segments of the rotor may be provided with a slit which is radially located between inner and outer peripheral sides of the rotor (ninth aspect of the present invention). In the second aspect of the invention set forth above, the number of in-slot conductors (the number of in-slot conductors accommodated in the slots) is smaller in the inner stator winding than in the outer stator winding. Therefore, the magnetomotive force of the winding of the outer stator becomes stronger than that of the winding of the inner stator. In this case, the magnetic flux formed in the passage of the inner stator and the segments tends to be pulled against and merge into the magnetic flux formed in the passage of the outer stator and the segments.

In a situation as set forth above, in the outer stator, the total amount of magnetic flux is increased, leading to excessive saturation of the core. On the other hand, in the inner stator, the total amount of magnetic flux is decreased, leading to low saturation of the core. Thus, the total amount of magnetic flux will be unbalanced between the outer and inner stators. This could leave a problem of an insufficient output, i.e. an output not matching the structure and the amount of the core material. In this regard, in the ninth aspect of the invention, slits are formed in the respective segments. Each slit has a function of magnetically dividing the segment into an inner peripheral portion and an outer peripheral portion, hardly allowing the magnetic flux to pass through the segment in the radial direction. As a result, the magnetic flux from the inner stator is effectively prevented from mingling with the magnetic flux from the outer stator. Accordingly, this suppresses the unbalance in the total amount of generated magnetic flux, between the inner and outer stators. In this way, the motor is able to provide an output which adapts to its structure and the amount of its core material.

Figure 8:
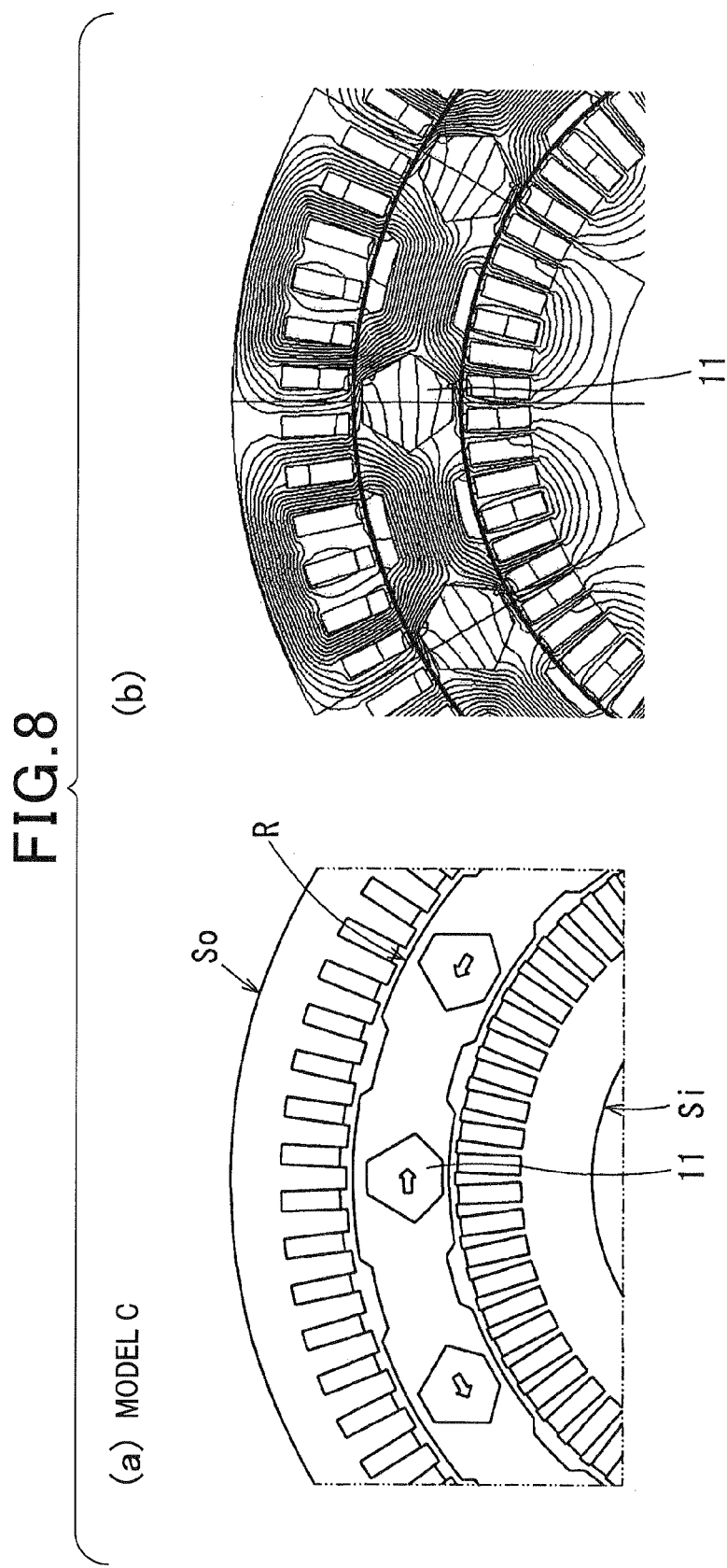
Figure 10:
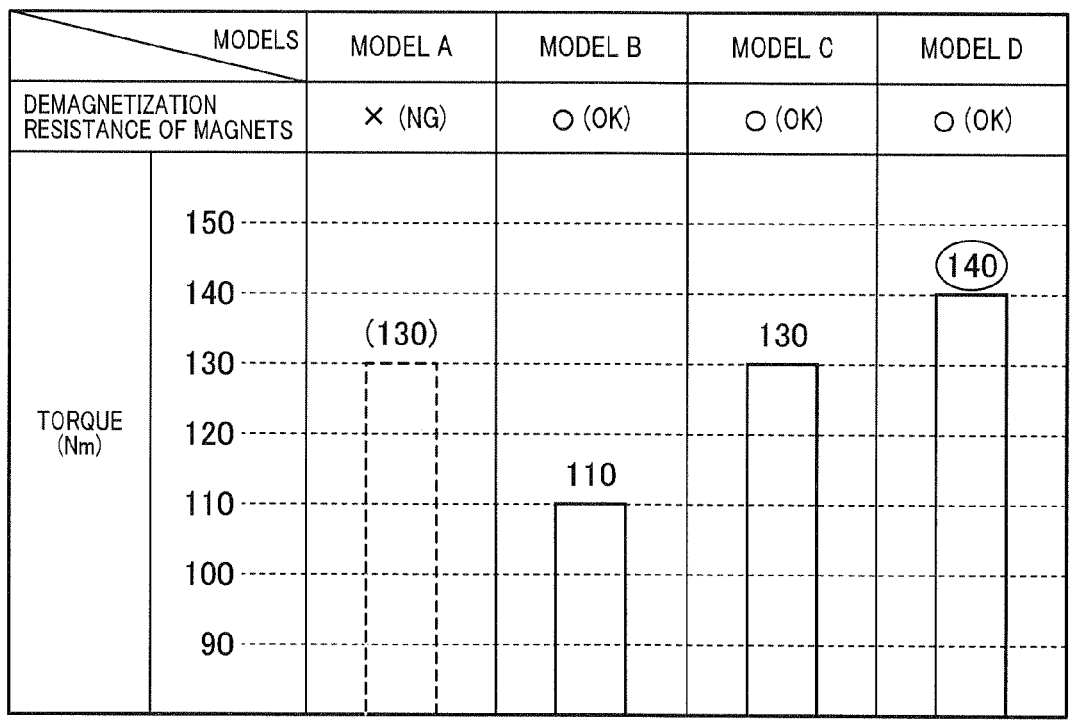
Figure 11:
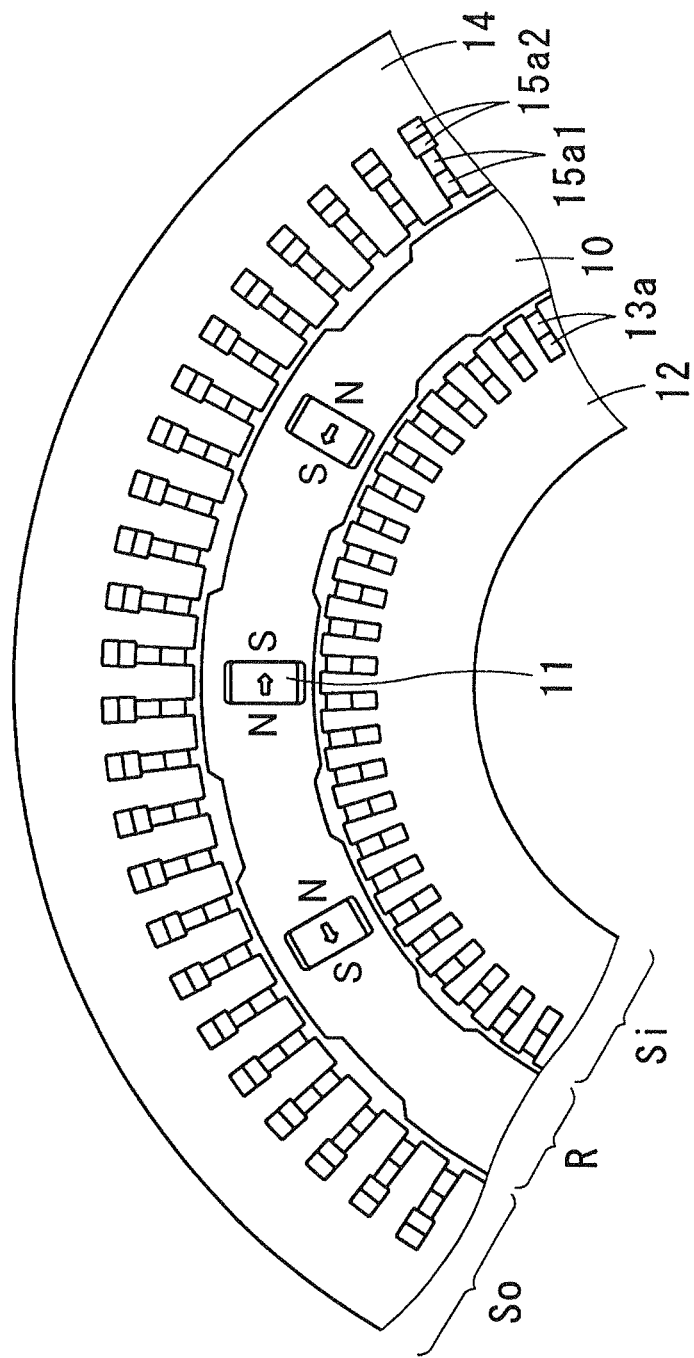
Figure 12:
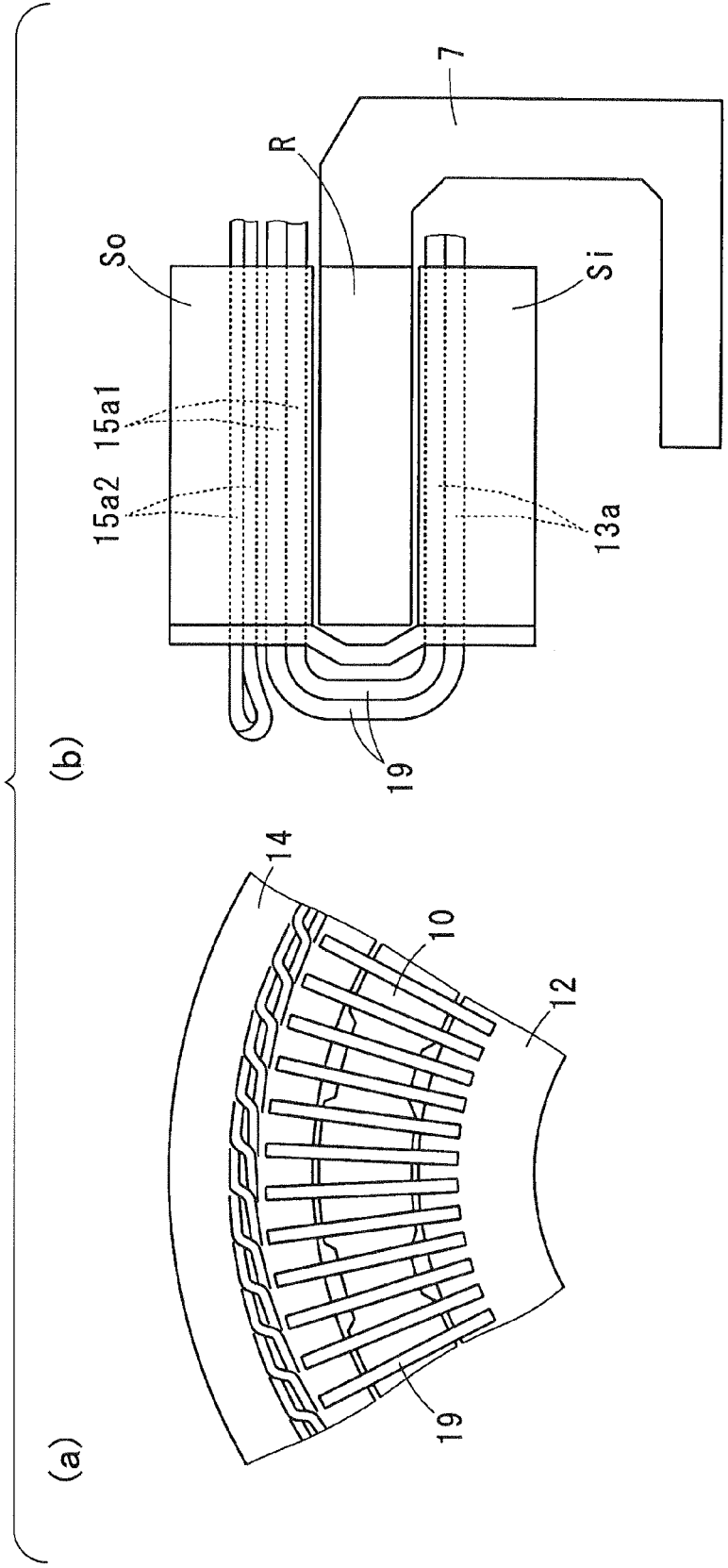
Figure 13:
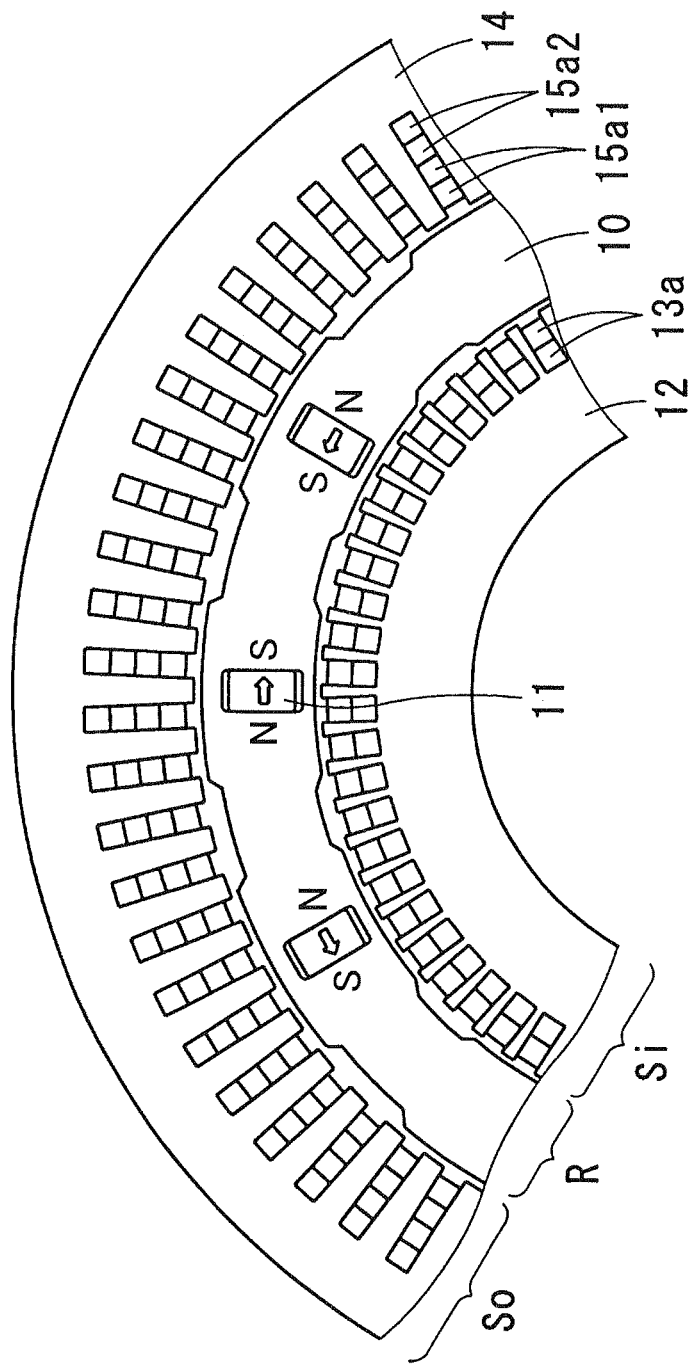
Figure 14:
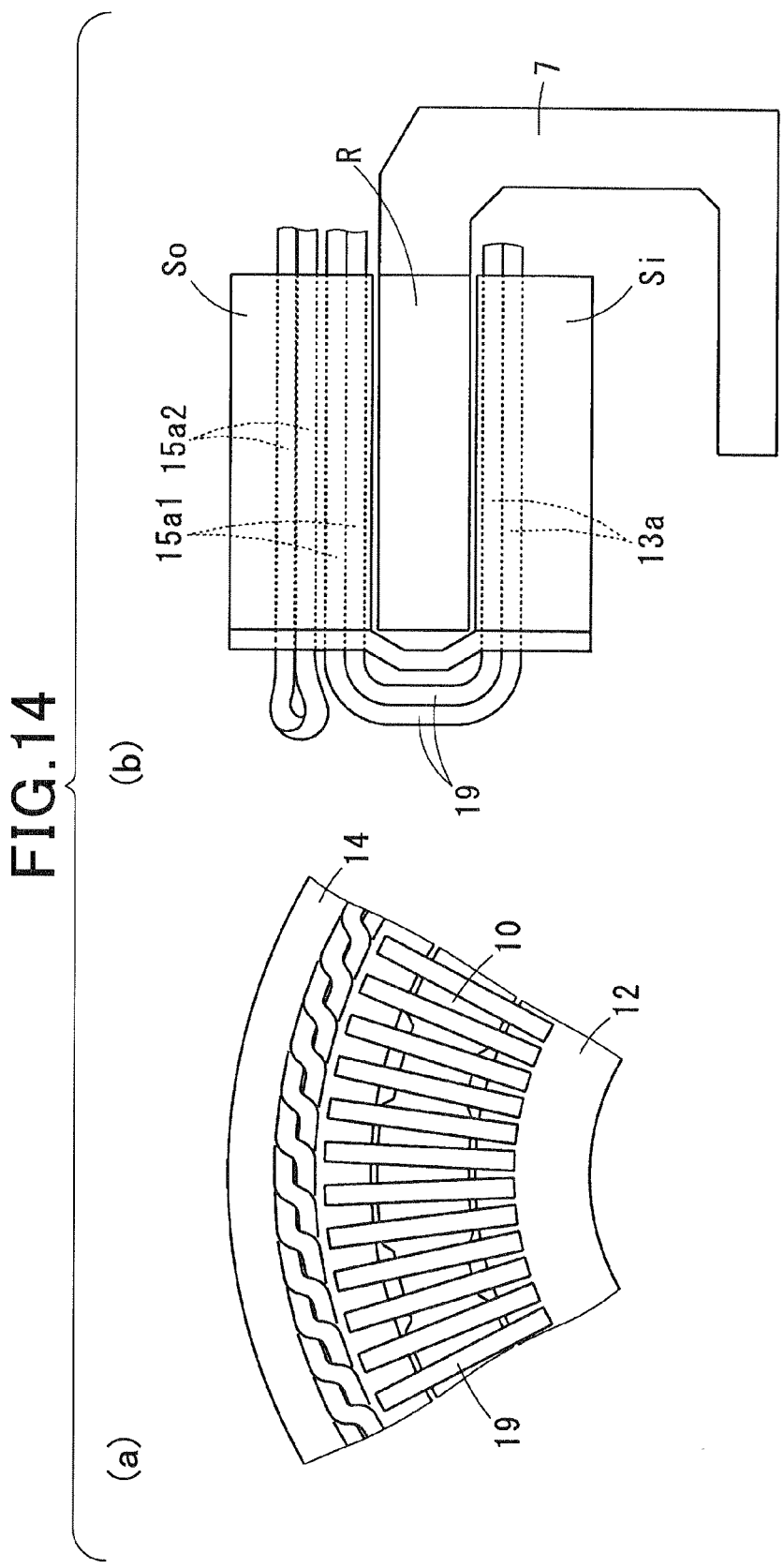
Figure 16:
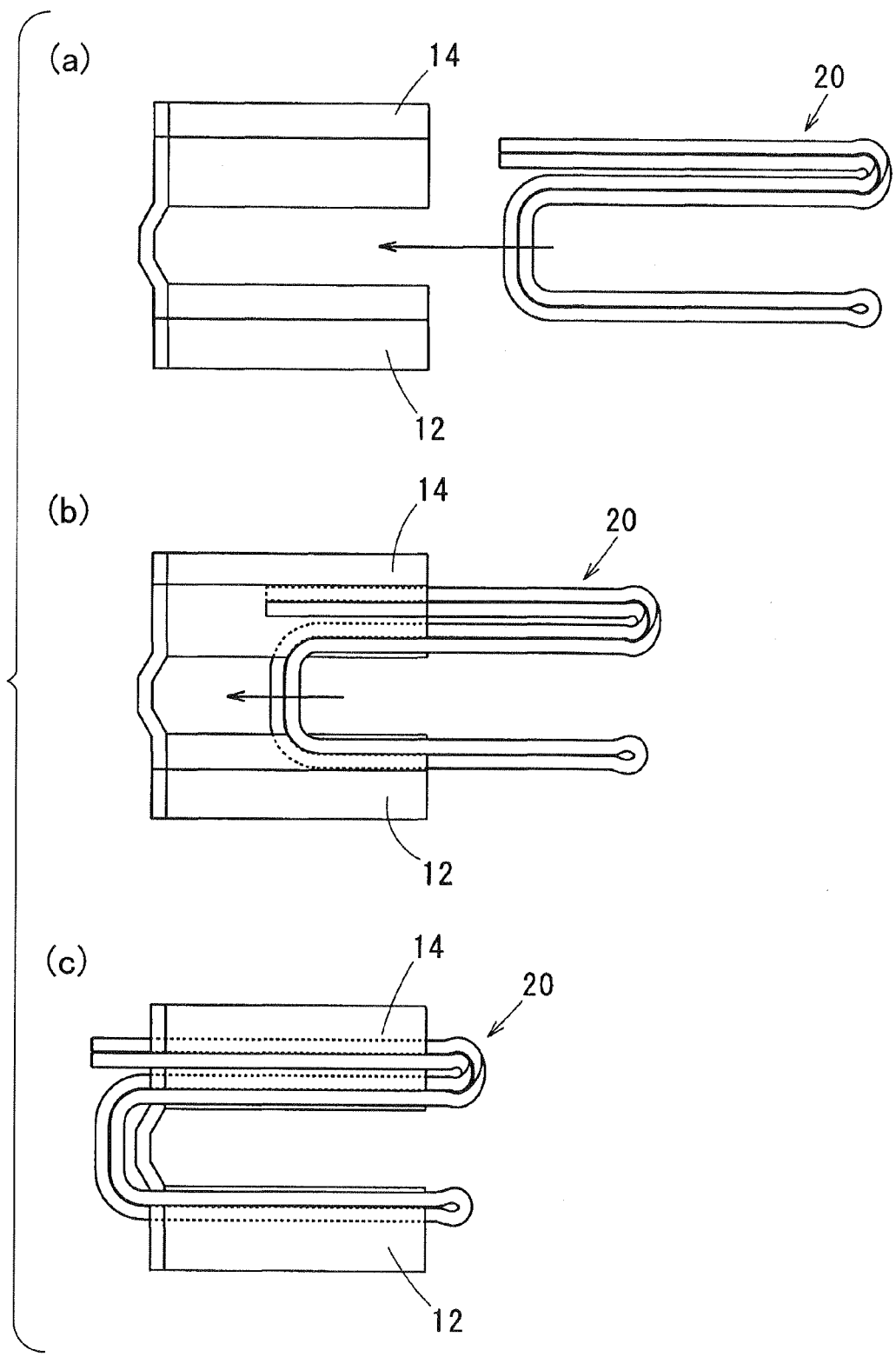
Figure 17:
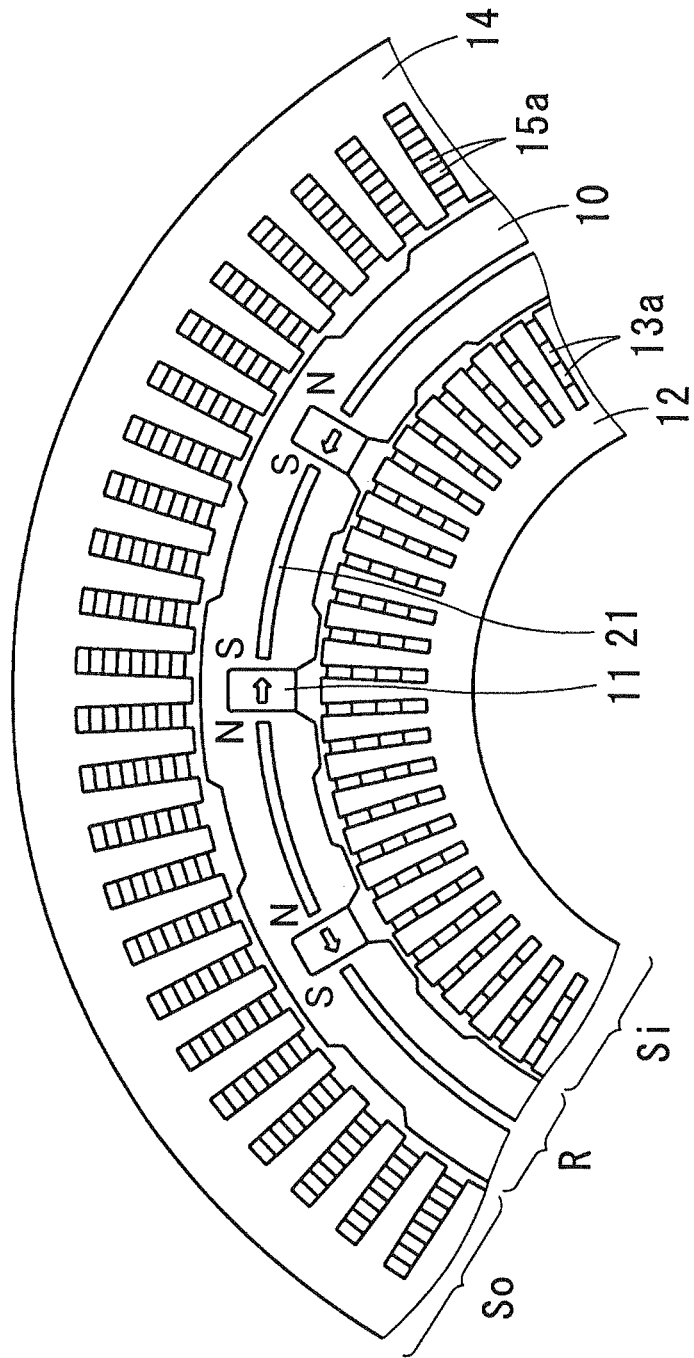

(a) of FIG. 4 is a diagram illustrating the shapes of the inner and outer stator windings as viewed from the axial direction;

(b) of FIG. 4 is a side view illustrating the shapes of the inner and outer stator windings;

FIG. 5 is a table showing basic configurations of models A to D of motors based on conventional ant and the present invention;

(a) of FIG. 6 is a cross-sectional view illustrating the configuration of the model A;

(b) of FIG. 6 is a diagram showing a magnetic field analysis of the model A;

(a) of FIG. 7 is a cross-sectional view illustrating the configuration of the model B;

(b) of FIG. 7 is a diagram showing a magnetic field analysis of the model B;

(a) of FIG. 8 is a cross-sectional view illustrating the configuration of the model C;

(b) of FIG. 8 is a diagram showing a magnetic field analysis of the model C;

(a) of FIG. 9 is a cross-sectional view illustrating the configuration of the model D;

(b) of FIG. 9 is a diagram showing a magnetic field analysis of the model D;

FIG. 10 is a table showing simulations of the models A to D;

FIG. 11 is a partial cross-sectional view illustrating a double-stator motor, with in-slot conductors of inner and outer stator windings being accommodated in slots, according to a second embodiment of the present invention;

(a) of FIG. 12 is a diagram illustrating the shapes of the inner and outer stator windings as viewed from the axial direction;

(b) of FIG. 12 is a side view illustrating the shapes of the inner and outer stator windings;

FIG. 13 is a partial cross-sectional view illustrating a double-stator motor, with in-slot conductors of inner and outer stator windings being accommodated in slots, according to a third embodiment of the present invention;

(a) of FIG. 14 is a diagram illustrating the shapes of the inner and outer stator windings as viewed from the axial direction;

(b) of FIG. 14 is a side view illustrating the shapes of the inner and outer stator windings;

(a) of FIG. 15 is a diagram illustrating the shapes of inner and outer stator windings as viewed from the axial direction, according to a fourth embodiment;

(b) of FIG. 15 is a side view illustrating the shapes of the inner and outer stator windings;

(a) to (c) of FIG. 16 are explanatory views illustrating a process of assembling the inner and outer stator windings into stator cores; and FIG. 17 is a partial cross-sectional view illustrating a double-stator motor, with in-slot conductors of inner and outer stator windings being accommodated in slots and with slits being formed in respective segments, according to a fifth embodiment of the present invention.

DETAILED DESCRIPTION OF THE PREFERRED EMBODIMENTS

With reference to the accompanying drawings, hereinafter are specifically described several embodiments of the present invention.

First Embodiment

Figure 1:
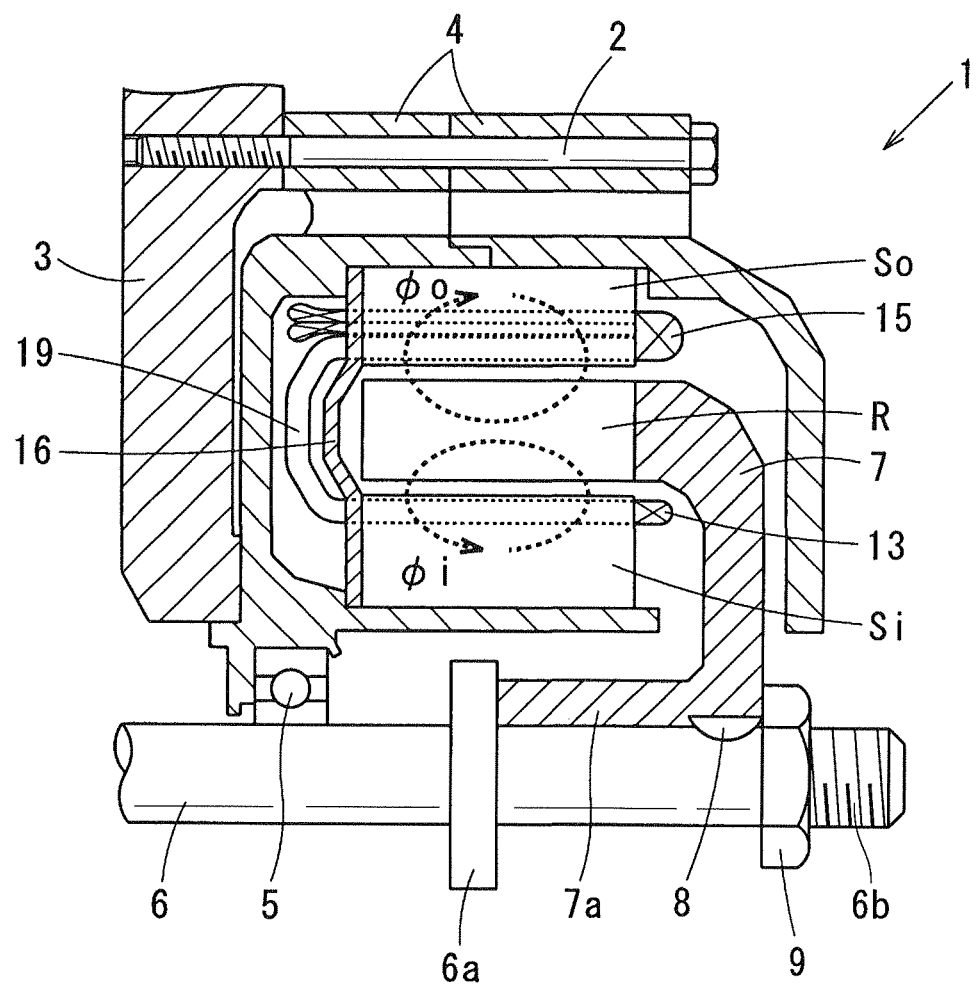
FIG. 1 is a general schematic diagram illustrating a double-stator motor according to a first embodiment of the present invention.
Figure 2:
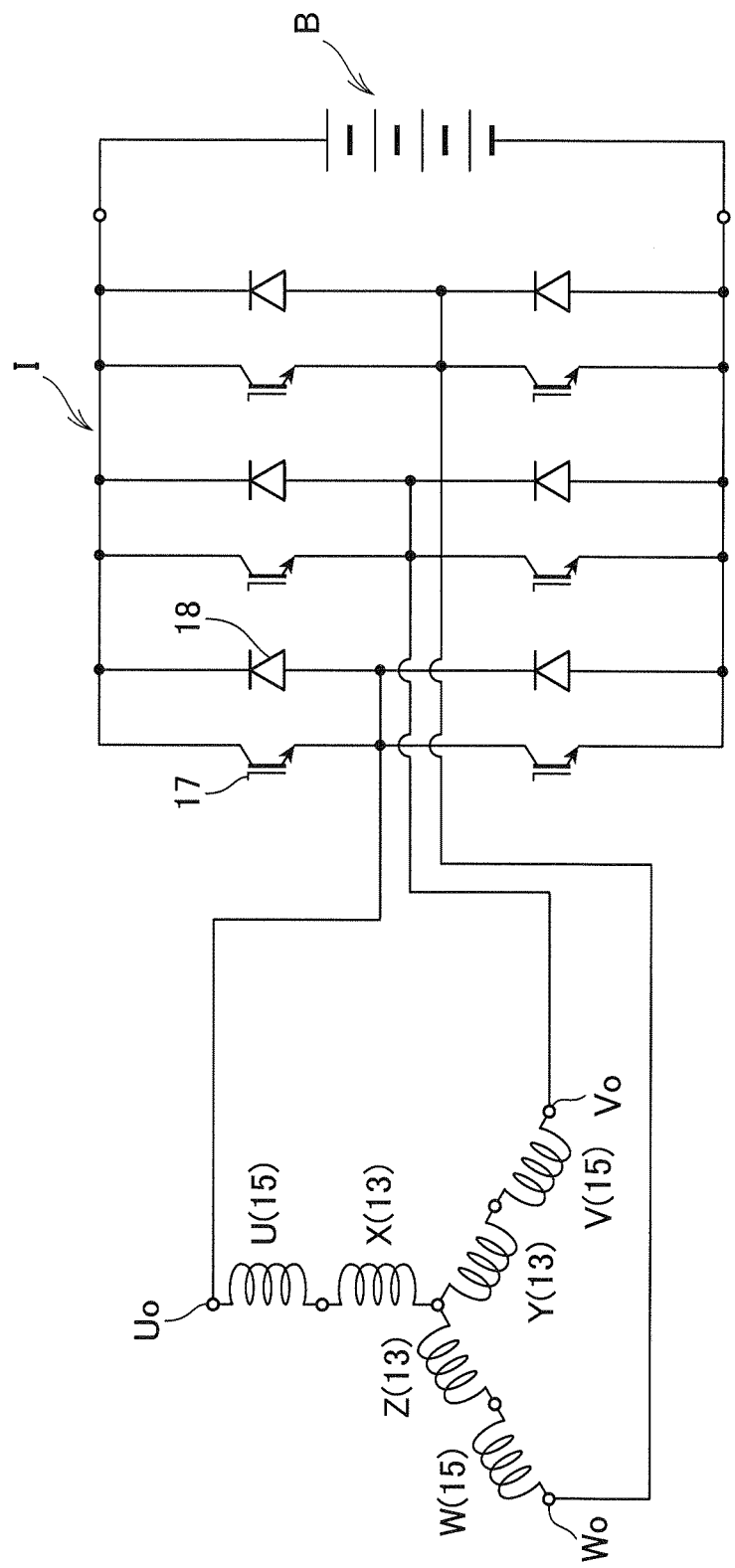
FIG. 2 is a connection diagram illustrating connection of inner and outer stator windings to an inverter, according to the first embodiment.
Figure 3:
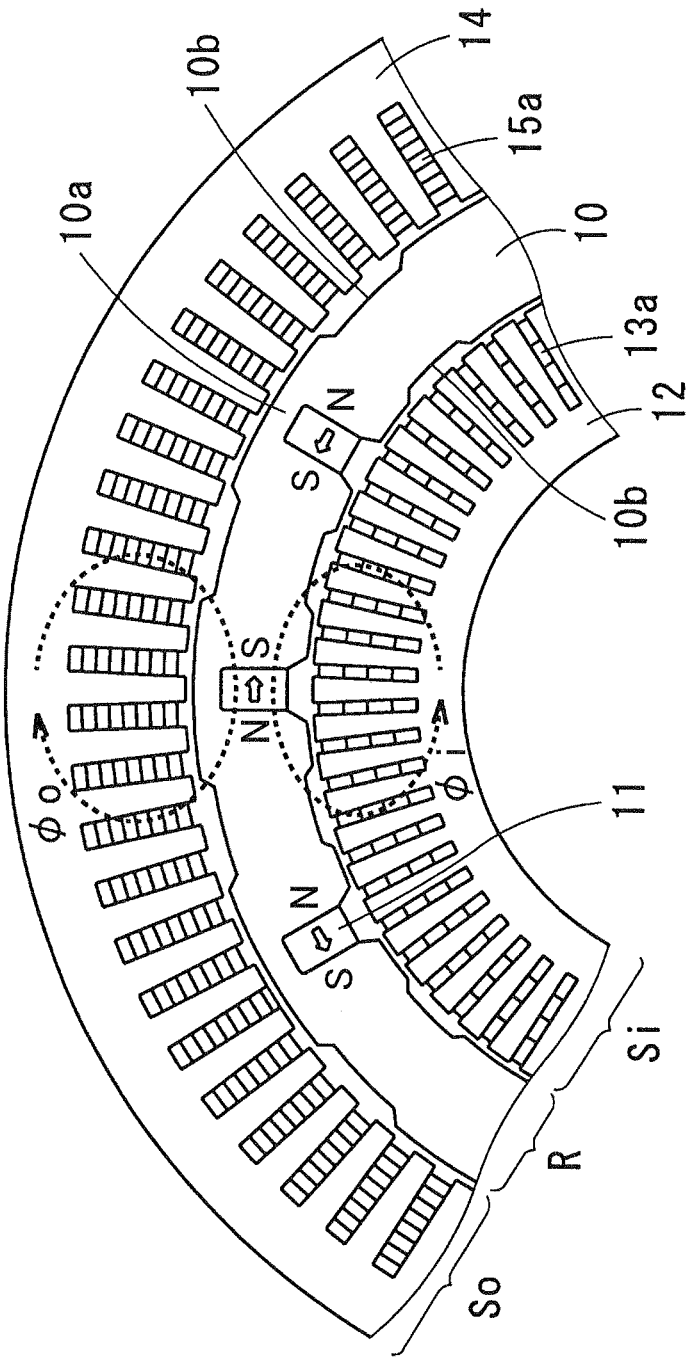
FIG. 3 is a partial cross-sectional view illustrating the double-stator motor, with in-slot conductors of the inner and outer stator windings being accommodated in slots.

Referring to FIG. 1 to FIG. 3, (a) and (b) of FIG. 4, a first embodiment of the present invention is described. FIG. 1 is a general schematic diagram illustrating a double-stator motor 1 according to the first embodiment. As shown in FIG. 1, the double-stator motor 1 includes a housing 3, a motor case 4, a shaft 6, an annular rotor R, an inner stator Si and an outer stator So. The motor case 4 is fixed to the housing 3 via a through bolt 2. The shaft 6 is rotatably supported by the motor case 4 via a bearing 5. The annular rotor R is connected to the shaft 6 via a rotor disc 7. The inner stator Si is arranged on a radially inner side of the rotor R and fixed to the motor case 4. The outer stator So is arranged on a radially outer side of the rotor R and fixed to the motor case 4. The rotor disc 7 is made such as of non-magnetic SUS (special use stainless steel). The rotor disc 7 includes a cylindrically shaped boss 7a at a radially center thereof. The boss 7a is fitted to the shaft 6 along the outer periphery thereof, allowing a key 8 to serve as a detent. The shaft 6 is provided with a flange 6a and an external thread 6b formed at an end of the shaft 6. A nut 9 is attached to the external thread 6b. The boss 7a is axially fixed to the shaft 6 by the flange 6a and the nut 9.

FIG. 3 is a partial cross-sectional view illustrating the rotor R, and the inner and outer stators Si and So. As shown in FIG. 3, the rotor R includes a plurality of segments 10 and a plurality of permanent magnets 11. The segments 10 are annularly connected to each other via bridges 10a. The permanent magnets 11 are each interposed between the segments 10 adjacent in the circumferential direction. The rotor R has an axial end face fixed to the rotor disc 7. In FIG. 3 illustrating a partial cross-sectional view of the rotor R, and the inner and outer stators Si and So, hatching indicating cross section is omitted. For example, the segments 10 are each configured by stacking electromagnetic steel plates 35H250 (trade name), a product of Nippon Steel Corporation. Each segment 10 has a recess 10b on the radially inner and outer peripheral sides thereof. Further, as mentioned above, the segments 10 adjacent in the circumferential direction are connected via the bridge 10a, on the radially outer peripheral side (or inner peripheral side). The recesses 10b are formed at the circumferentially center of each segment 10. For example, the permanent magnets 11 are ferrite magnets FB14H (trade name), a product of TDK Corporation. The ferrite magnets are alternately magnetized in the circumferentially opposite direction. Specifically, as shown by arrows in FIG. 3, each surface of two adjacent magnets 11 which are circumferentially opposed to each other corresponds to same magnetic pole, i.e. has the same polarity.

The inner stator Si includes an inner stator core 12 and an inner stator winding 13. The inner stator core 12 is provided with a plurality of slots which are formed with a constant pitch in the circumferential direction and opened in the outer peripheral surface of the core. The inner stator winding 13 is wound about the inner stator core 12 via the plurality of slots. The outer stator So includes an outer stator core 14 and an outer stator winding 15. The outer stator core 14 is provided with a plurality of slots which are formed with a constant pitch in the circumferential direction and opened in the inner peripheral surface of the core. The outer stator winding 15 is wound about the outer stator core 14 via the plurality of slots. The inner stator core 12 and the outer stator core 14 are both configured by stacking core-shaped electromagnetic steel plates (e.g., 35H250) obtained by punching. As shown in FIG. 1, the axial end faces of the inner and outer stator cores 12 and 13, i.e. the axially left end faces as viewed in the figure, are fixed to the end face of a holding plate 16 such as by welding.

For example, the holding plate 16 is formed by pressing a low-carbon steel plate of 2 mm thick into an annular shape, so that the axial end face of the inner stator core 12 is fixed to the radially inner portion of its end face and the axially end face of the outer stator core 14 is fixed to the radially outer portion of its end face. Slots are also formed in the holding plate 16. The number of the slots is the same as that of the slots formed in the inner stator core 12 and that of the slots formed in the outer stator core 14. Also, the circumferential positions of the slots of the holding plate 16 coincide with those of the slots formed in the inner and outer stator cores 12 and 14. With the fixation of the inner and outer stator cores 12 and 14 to the holding plate 16, the inner and outer stators Si and So are coaxially held. The entirety is configured as a sub-assembly component used in assembling the inner and outer stator windings 13 and 15.

As mentioned above, the number of the slots formed in the inner stator core 12 of the inner stator Si is the same as that of the slots formed in the outer stator core 14 of the outer stator So. Further, the number of stator poles is the same as that of the rotor poles. In other words, the rotor R, the inner stator Si and the outer stator So all have the same number of poles (twelve poles in the present embodiment). Flat conductors having a rectangular cross section perpendicular to the longitudinal direction are used as the inner and outer stator windings 13 and 15. The area of the rectangular cross section is the same between the inner and outer stator windings 13 and 15. FIG. 2 is a connection diagram illustrating connection of the inner and outer stator windings 13 and 15 to an inverter I. As shown in FIG. 2, the inner stator winding 13 is formed by star-connecting three-phase coils X, Y and Z. Also, the outer stator winding 15 is formed by connecting three-phase coils U, V and W in series with the three-phase coils X, Y and Z, respectively, of the inner stator winding 13. As shown in FIG. 2, the three-phase coils U, V and W have terminals Uo, Vo and Wo, respectively, which are connected to the inverter I. The inverter I has a well-known configuration and includes a plurality of switching elements 17 and diodes 18 as well as switching controller (not shown). The inverter I is connected to a battery B.

The inner and outer stator windings 13 and 15 have straight in-slot conductors 13a and 15a, respectively, which are accommodated in the slots. The number of the in-slot conductors 13a of the stator winding 13 is ensured to be smaller than the number of the in-slot conductors 15a of the outer stator winding 15. In the first embodiment, as shown in FIG. 3, the number of the in-slot conductors 15a of the outer stator winding 15 is eight, while that of the in-slot conductors 13a of the inner stator winding 13 is four. In other words, per one phase and per one pole, the number of turns is eight in the outer stator winding 15, while the number of turn is four in the inner stator winding 13. As mentioned above, the inner and outer stator windings 13 and 15 (or the in-slot conductors 13a and 15a) are flat conductors having a rectangular cross section perpendicular to the longitudinal direction. The inner stator winding 13 is arranged lengthwise in the slots. In other words, the inner stator winding 13 (or in-slot conductors 13a) is arranged in the slots so that the long sides of the rectangular cross section are directed to the radial direction of the inner stator core 12. On the other hand, the outer stator winding 15 (or in-slot conductors 15a) is arranged widthwise in the slots. In other words, the outer stator winding 15 is arranged in the slots so that the long sides of the rectangular cross section are directed to the circumferential direction of the outer stator core 14.

With the configuration as described above, the cross-sectional area, perpendicular to the axial direction, of each slot in the inner stator Si is about half of the similar cross-sectional area of each slot in the outer stator So. Further, as mentioned above, in each slot of the outer stator So, the in-slot conductors 15a are arranged widthwise, occupying a large space in the circumferential direction. On the other hand, in each slot of the inner stator Si, the in-slot conductors 13a are arranged lengthwise, occupying a small space in the circumferential direction and being elongated in the radial direction. (a) of FIG. 4 is a diagram illustrating the shapes of the inner and outer stator windings 13 and 15 as viewed from the axial direction. (b) of FIG. 4 is a side view illustrating the shapes of the inner and outer stator windings 13 and 15. As shown in (b) of FIG. 4, of the eight in-slot conductors 15a of the outer stator winding 15, four are accommodated on the radially inner side of the slot (hereinafter referred to as inner in-slot conductors 15a1). The four inner in-slot conductors 15a1 are continuously integrated with the respective four in-slot conductors 13a of the inner stator winding 13 via respective bridges 19.

Specifically, the bridges 19 are arranged radially bridging the inner and outer stators Si and So on the left end side, as viewed in (b) of FIG. 4, of the rotor R. More specifically, the bridges 19, forming a U-shape, connect the respective inner in-slot conductors 15a1 of the outer stator winding 15 to the respective in-slot conductors 13a of the inner stator winding 13. Thus, each of the bridges 19 connects the corresponding inner in-slot conductor 15a1 arranged widthwise, to the corresponding in-slot conductor 13a arranged lengthwise. Therefore, as shown in (a) of FIG. 4, each bridge 19 includes a twist 19a in which the bridge 19 is twisted by 90 degrees. Hereinafter, each inner in-slot conductor 15a1 and the corresponding in-slot conductors 13a, which are integrally connected via the corresponding bridge 19, are, as a whole, referred to as a first U-shaped conductor.

Of the eight in-slot conductors accommodated in each slot of the outer stator core 14, four are arranged radially outside the inner in-slot conductors 15a1 (hereinafter referred to as outer in-slot conductors 15a2). As shown in (b) of FIG. 4, the four outer in-slot conductors 15a2 are provided in the form of two sets of U-shaped conductors (hereinafter each referred to as a second U-shaped conductor). Specifically, each second U-shaped conductor is an integration of two outer in-slot conductors 15a2 accommodated in two different slots located in the circumferential direction of the outer stator core 14. More specifically, one outer in-slot conductor 15a2 in one slot is connected to another outer in-slot conductor 15a2 in another slot, the two in-slot conductors being integrally connected to each other forming a U-shape outside the axially left end face of the outer stator core 14, as viewed in (b) of FIG. 4.

The first and second U-shaped conductors are axially inserted and assembled into the inner and outer stator cores 12 and 14, with the ends opposite to the U-shaped side being as the heads of insertion, for accommodation in the slots. The ends which are opposite to the U-shaped side and projected from the slots are circumferentially twisted by a predetermined angle and joined to each other in a hexagonal shape. In this way, the inner and outer stator windings 13 and 15 are connected, so that the windings, as a whole, form the phases X, Y and Z and the phases U, V and W. However, the inner and outer stator windings 13 and 15 are connected such that their phases are reversed to each other. Thus, as indicated by the broken-line arrows in FIG. 3, magnetic fields φi and φo generated by the magnetomotive forces of the stator windings 13 and 15, respectively, are parallelly applied to specific segments 10 of the rotor R from both of radially inner and outer sides of the segments 10.

Hereinafter, the operation of the double-stator motor 1 is described. It is preferable that the center of current distribution is located at an angle slightly offset from the center of the segments 10 adjacent in the circumferential direction of the rotor R. Thus, AC current is passed through the inner and stator windings 13 and 15 from the inverter I in a manner of achieving the above current distribution. Upon application of the current, the segments 10 are magnetically attracted toward the center of the current distribution. In other words, reluctance torque is generated. Also, since each segment 10 is magnetized by the adjacent permanent magnets 11 (ferrite magnets) to form a magnetic pole, the center of the segment 10 is attracted to the center of the current distribution. In other words, magnet torque is generated. The reluctance torque and the magnet torque cooperate with each other to drive the rotor R, thereby rotating the shaft 6 for the operation of the motor.

The permanent magnets 11 each located between the circumferentially adjacent segments 10 are magnetized being directed to the respective segments 10, or magnetized in the circumferential direction. Further, the magnetomotive forces of the windings of the inner and outer stators Si and So will not cooperate in the same direction. Instead, as shown in FIG. 3, the magnetic fields φi and φo generated by the magnetomotive forces, are parallelly applied to specific segments 10 from both of radially inner and outer sides of the segments 10. Accordingly, the permanent magnets 11 are applied with demagnetizing fields of substantially an average level of the windings Si and So, instead of being applied with demagnetizing fields that would be generated by the sum of the magnetomotive forces of the windings of the stators Si and So. In other words, the motor can exert high performance with the reduction of the intensity of the demagnetizing fields applied to the permanent magnets 11, to an intensity level lower than in the motor of the conventional art disclosed in JP-A-H03-139156. In addition, with the intensity of the demagnetizing fields being reduced, the motor will hardly suffer from demagnetization. Further, in spite of the double stator structure, the inner and outer stator windings 13 and 15, in the form of the first and second U-shaped conductors, can be wound about the stators. Accordingly, for example, it is not required to use a plurality of inverters I in order to parallelly pass current to the windings of the inner and outer stators Si and So because of the different cross-sectional area, perpendicular to the longitudinal direction, of the windings. Thus, the winding conductors having the same cross-sectional area can be collectively wound about the inner and outer stators Si and So to thereby facilitate the labor involved in the winding work.

Hereinafter, the advantages of the present invention will be described. The following description is based on the simulations of the output characteristics of motors. Specifically, the simulations were conducted under unified analysis conditions (as set forth below), using, as specific examples, models A to D including a single-stator motor of conventional art and the double-stator motor of the present invention.

Unified analysis conditions:
Number of rotations: 1000 rpm
Current: 140 A rms
Current phase angle: 50 deg E
Magnet temperature: 60 deg C FIG. 5 is a table showing basic configurations of the simulation models A to D. In FIG. 5, the term magnet thickness refers to an average magnet thickness in the magnetizing direction. (a) and (b) of FIG. 6, (a) and (b) of FIG. 7, (a) and (b) of FIG. 8, (a) and (b) of FIG. 9 show the analyses of the shapes and the magnetic fields of the models A to D. FIG. 10 is a table listing the simulations of the models A to D.

(a) and (b) of FIG. 6 show the analysis of the model A that is an example of an IPM motor (single-stator motor) embedding permanent magnets. In such a motor, in general, neodymium magnets are used as the permanent magnets. However, in the motor model A, the neodymium magnets are replaced by the ferrite magnets 11. As shown in FIG. 10, the model A generates a reasonable torque. However, as will be understood from the magnetic diagram shown in (b) of FIG. 6, the magnetic lines in the magnets 11 are very sparse. In other words, the intensity of the demagnetizing fields applied to the magnets 11 becomes strong to cause degauss. Therefore, the model A raises a problem of not functioning as a motor. As a measure against this, the model A was improved by thickening each magnet 11 to enhance the resistance against demagnetization (demagnetization resistance). The improved model is the model B shown in (a) and (b) of FIG. 7. As shown in FIG. 10, the model B is strong against demagnetization but raises a problem of generating only a small torque.

On the other hand, the model C (see (a) and (b) of FIG. 8) included in the first aspect of the present invention has a double-gap structure. In the double-gap structure, the magnetic fields of the inner and outer stators Si and So are ensured to be parallel to and opposed to each other. Further, the rotor R of the model C includes a plurality of segments 10 with the ferrite magnets 11 being each arranged therebetween. Similar to the model B, the model C has no worries of demagnetization of the magnets 11 and, moreover, exerts an effect of generating torque larger than the model B. However, as will be understood from the shape of the model shown in (a) of FIG. 8, in the model C, the outer stator So has teeth each having a minimum width of 3.5, while the inner stator Si has teeth each having a very small minimum width of 1. Accordingly, the model C raises a problem of increasing unbalance in the size of the magnetic flux passage between the inner and outer stators Si and So.

As a measure against the above problem, the model D (see (a) and (b) of FIG. 9) corresponding to the first embodiment was provided. The model D has a large number of in-slot conductors in the outer stator So but has a small number of in-slot conductors in the inner stator Si. For example, the outer stator So is larger in both of the number of the in-slot conductors and the cross-sectional area of each slot, than the inner stator Si, as expressed by a ratio 2:1. With this configuration, each tooth in the outer stator So has a minimum width of 3 mm, while each tooth of the inner stator Si has a minimum width of 2 mm. Thus, compared to the model C, the model D is improved in that the minimum width of each tooth of the inner stator Si has been increased by a factor of two. As a result, torque is enhanced in the model D, as will be apparent from the comparison between the models C and D in FIG. 10. As described so far, being a small-diameter motor of about φ180 mm, the model D corresponding to the first embodiment of the present invention more enhances demagnetization resistance and exerts higher performance than the model A (single-stator motor that cannot endure demagnetization).

Further, compared to the model B (single-stator motor that can endure demagnetization), the model D enhances torque by about 30 Nm.

Second Embodiment

Referring now to FIG. 11, (a) and (b) of FIG. 12, hereinafter is described a second embodiment of the present invention. In the second and the subsequent embodiments, the components identical with or similar to those in the first embodiment are given the same reference numerals for the sake of omitting unnecessary explanation. FIG. 11 is a partial cross-sectional view illustrating the rotor R, and the inner and outer stators Si and So. (a) of FIG. 12 is a diagram illustrating the shapes of the inner and outer stator windings 13 and 15 as viewed from the axial direction. (b) of FIG. 12 is a side view illustrating the shapes of the inner and outer stator windings 13 and 15. Similar to the first embodiment, flat conductors are used as the inner and outer stator windings 13 and 15. The flat conductors both have a rectangular cross section perpendicular to the longitudinal direction, and have the same cross-sectional area perpendicular to the longitudinal direction. In the first embodiment described above, the inner and outer in-slot conductors 15a1 and 15a2 of the outer stator winding 15 are arranged widthwise (so that the long sides of the rectangular cross section are directed to the circumferential direction of the outer stator core 14). In the second embodiment, however, as shown in FIG. 11, the outer in-slot conductors 15a2 are arranged widthwise, while the inner in-slot conductors 15a1 are arranged lengthwise (so that the long sides of the rectangular cross section are directed to the radial direction of the outer stator core 14). In FIG. 11 illustrating a partial cross-sectional view of the rotor R, and the inner and outer stators Si and So, hatching indicating cross section is omitted. It should be appreciated that, similar to the first embodiment, the in-slot conductors 13a of the inner stator winding 13 are arranged lengthwise.

With the configuration described above, the lengthwise arrangement is used for the inner in-slot conductors 15a1 of the outer stator winding 15 and the respective in-slot conductors 13a of the inner stator winding 13, which are continuously connected via the respective bridges 19. Therefore, as shown in (a) and (b) of FIG. 12, the bridges 19 are not required to be twisted by 90 degrees. In other words, the advantages similar to those of the first embodiment are achieved without requiring the labor of twisting the bridges 19 by 90 degrees. Accordingly, the number of steps of manufacturing the motor is reduced. Further, owing to the lengthwise arrangement of the inner in-slot conductors 15a1 of the outer stator winding 15, the minimum width of each tooth of the outer stator So is increased. Thus, the amount of magnetic flux passing through the outer stator So is increased, exerting the effect of further enhancing torque.

Third Embodiment

Referring to FIG. 13, (a) and (b) of FIG. 14, hereinafter is described a third embodiment of the present invention. FIG. 13, (a) and (b) of FIG. 14 correspond to FIG. 11, (a) and (b) of FIG. 12 of the second embodiment, respectively. In the third embodiment, as shown in FIG. 13, the conductors of the inner and outer stator windings 13 and 15 all have the same cross-sectional shape (substantially square) perpendicular to the longitudinal direction, and the same cross-sectional area perpendicular to the longitudinal direction. In FIG. 13 illustrating a partial cross-sectional view of the rotor R, and the inner and outer stators Si and So, hatching indicating cross section is omitted. As shown in (a) and (b) of FIG. 14, no twist is given to the bridges 19 connecting between the respective inner in-slot conductors 15a1 of the outer stator winding 15 and the respective in-slot conductors 13a of the inner stator winding 13. The above configuration is suitable for a motor having the inner and outer stator windings 13 and 15 with a small number of turns. This configuration exerts an effect of simplifying the winding structure when the conductors of the inner and outer stator windings 13 and 15 have substantially a square cross section.

Fourth Embodiment

Referring to (a) and (b) of FIG. 15 as well as (a) to (c) of FIG. 16, a fourth embodiment of the present invention is described. (a) of FIG. 15 is a diagram illustrating the shapes of the inner and outer stator windings 13 and 15 as viewed from the axial direction. (b) of FIG. 15 is a side view illustrating the shapes of the inner and outer stator windings 13 and 15. (a) to (c) of FIG. 16 are explanatory views illustrating a process of assembling the inner and outer stator windings 13 and 15 into the stator cores. The fourth embodiment shows an example of configuring a continuous winding body, as a winding component 20 (see (a) to (c) of FIG. 16), of the inner and outer stator windings 13 and 15 corresponding to one phase. Similar to the third embodiment, the conductors of the inner and outer stator windings 13 and 15 all have the same cross-sectional shape (substantially square) and the same cross-sectional area (see (a) and (b) of FIG. 15). As shown in (b) of FIG. 15, the inner in-slot conductors 15a1 of the outer stator winding 15 are continuously connected to the respective in-slot conductors 13a of the inner stator winding 15 via the respective bridges 19, forming a U-shape on one axial end side (left side as viewed in (b) of FIG. 15). Further, on the other axial end side (right side as viewed in (b) of FIG. 15), the inner in-slot conductors 15a1 are continuously connected, forming a U-shape, to the respective outer in-slot conductors 15a2. Thus, the inner and outer stator windings 13 and 15 configure, as a whole, the winding component 20 having a continuous serpentine shape.

As shown in (a) to (c) of FIG. 16 in this order, the winding component 20 is inserted and assembled into the inner and outer stator cores 12 and 14, at a time, from an axial end side, i.e. the right end side as viewed in the figures. A plurality of winding components 20 are assembled, in this manner, into the inner and outer stator cores 12 and 14. The ends of the plurality of winding components 20 assembled in this way are connected to each other to thereby create one phase with the stator windings 13 and 15. In the above configuration, the conductors of the inner and outer stator windings 13 and 15 are formed into one winding component 20 having a serpentine shape. Accordingly, the process of assembling the inner and outer stator windings 13 and 15 is simplified. In other words, a continuous body of the winding component 20 is accommodated, with one stroke, in the slots of the inner and outer stator cores 12 and 14. Accordingly, the number of steps of assembling the inner and outer stator windings 13 and 15 is reduced and thus the time taken for the assemblage is shortened. When the winding structure is complicated, use of the double-stator motor 1 of the present invention is not practical from the viewpoint of cost. However, since the winding structure is simplified in the fourth embodiment, the double-stator motor is realized at very low cost equivalent to the cost incurred in the winding process such as of a small-size motor. Thus, the configuration of the fourth embodiment is particularly suitable for small-size motors.

Fifth Embodiment

Referring to FIG. 17, a fifth embodiment of the present invention is described. FIG. 17 is a partial cross-sectional view illustrating the rotor R, and the inner and outer stators Si and So, with slits 21 formed in the respective segments 10, according to the fifth embodiment. In the first to fourth embodiments described above, the number of in-slot conductors (the number of in-slot conductors accommodated in the slots) is smaller in the inner stator winding 13 than in the outer stator winding 15. Therefore, the magnetomotive force of the winding of the outer stator So becomes stronger than that of the winding of the inner stator Si. In this case, the magnetic flux formed in the passage of the inner stator Si and the segments 10 tends to be pulled against and merge into the magnetic flux formed in the passage of the outer stator So and the segments 10. As a result, in the outer stator So, the total amount of magnetic flux is increased, leading to excessive saturation of the core. On the other hand, in the inner stator Si, the total amount of magnetic flux is decreased, leading to low saturation of the core. Thus, the total amount of magnetic flux will be unbalanced between the outer and inner stators So and Si. This could leave a problem of an insufficient output, i.e. an output not matching the structure and the amount of the core material.

To cope with this, in the fifth embodiment, slits 21 are formed in the respective segments 10 of the rotor R as shown in FIG. 17. In FIG. 17 illustrating a partial cross-sectional view or the rotor R, and the inner and outer stators Si and So, hatching indicating cross section is omitted. The slits 21 are formed in the respective segments 10, forming an arc shape in the circumferential direction. Each slit 21 has a function of magnetically dividing the segment 10 into an inner peripheral portion and an outer peripheral portion, hardly allowing the magnetic flux to pass through the segment 10 in the radial direction. As a result, the magnetic flux in relation to the inner stator Si is effectively prevented from being mingled into the magnetic flux in relation to the outer stator So. This suppresses the unbalance in the total amount of generated magnetic flux, between the inner and outer stators Si and So. In this way, the motor is able to provide an output suitable for its structure and the amount of its core material.

[Modifications]

The first embodiment described above shows an example in which ferrite magnets are used as the permanent magnets 11 of the rotor R. Alternative to this however, rare-earth magnets (e.g., neodymium magnets) may be used as the permanent magnets 11. Alternatively, ferrite magnets and rare-earth magnets may be alternately arranged in the circumferential direction. In the second to fourth embodiments described above, the numbers of the in-slot conductors, i.e. the numbers of turns per one phase and per one pole, of the inner and outer stator windings 13 and 15 are set to two and four, respectively (see FIGS. 11, 13, (a) and (b) of FIG. 15). Alternative to this, the numbers of turns may be four and eight similar to the first embodiment. Conversely, in the first embodiment, the numbers of the in-slot conductors of the inner and outer stator windings 13 and 15 may be two and four, respectively. Further, the ratio of the number of in-slot conductors between the inner and outer stator windings 13 and 15 is not necessarily limited to 1:2, but may be 3:4 (e.g., six turns and eight turns).

In the double-stator motor 1 described in the first embodiment, the inner and outer stators Si and So are configured to have the same number of slots. Alternative to this, the number of slots of the inner stator Si may be smaller than that of the outer stator So. In this case, the inner stator core 12 will have a larger slot pitch compared to the outer stator core 14. Accordingly, for example, even in a small-diameter motor, the inner stator core 12, as a passage of magnetic flux, will be ensured to have a sufficiently large cross-sectional area perpendicular to the axial direction. As a result, under constraints in the diameter difference, the inner stator Si may be easily designed to be smaller than the outer stator So.

What is claimed is:

1. A double-stator motor comprising:
an annular rotor connected to a rotary shaft and integrally rotates with the rotary shaft;
an inner stator arranged radially inward of the rotor;
an outer stator arranged radially outward of the rotor;
a plurality of segments annularly arranged in the circumferential direction in the rotor, being spaced apart from each other by a predetermined distance; and
a plurality of permanent magnets each of which is interposed between circumferentially adjacent segments, and the permanent magnets are alternately magnetized in the circumferentially opposite direction;
wherein
the inner stator includes an inner stator core having a plurality of slots which are open in an outer periphery thereof, and a three-phase inner stator winding wound about the inner stator core through the plurality of slots;
the outer stator includes an outer stator core having a plurality of slots which are open in an inner periphery thereof, and a three-phase outer stator winding wound about the outer stator core through the plurality of slots;
the rotor, the inner stator and the outer stator have the same number of poles;
the inner and outer stator windings of the inner and outer stators are mutually connected so that their phases are reversed to each other in order that the magnetic fields generated by the magnetomotive forces of the inner and outer stators are applied to specific segments in parallel;
the number of slots of the inner stator core of the inner stator is equal to the number of slots of the outer stator core of the outer stator; the inner and outer stator windings have their in-slot conductors accommodated in the slots; and the number of in-slot conductors of the inner stator winding is smaller than the number of in-slot conductors of the outer stator winding.

2. The double-stator motor according to claim 1, wherein the in-slot conductors of the outer stator winding include inner in-slot conductors accommodated in the slots on an inner-peripheral side thereof and outer in-slot conductors accommodated in the slots on an outer-peripheral side of the inner in-slot conductors; and the inner in-slot conductors of the outer stator winding and the in-slot conductors of the inner stator winding are continuously and integrally provided, forming a U-shape, via bridges that are arranged so as to radially bridge between the inner and outer stators on one axial end side of the rotor.

3. The double-stator motor according to claim 2, wherein in the outer stator winding, one and the other of the outer in-slot conductors that are accommodated in two circumferentially different slots of the outer stator core is continuously and integrally provided by forming a U-shape outside an axial end face of the outer stator core; and the inner and outer in-slot conductors of the outer stator winding is mutually electrically and mechanically connected on an axial end side opposite to the U-shaped side.

4. The double-stator motor according to claim 2, wherein in the inner and outer stator windings, each in-slot conductors has a rectangular cross section having the same cross-sectional area; the in-slot conductor of the inner stator winding is accommodated in each slot so that the long sides of each rectangular cross section are directed in the radial direction of the inner stator core; the in-slot conductor of the outer stator winding is accommodated in each slot so that the long sides of each rectangular cross section are directed in the circumferential direction of the outer stator core; and each bridge has the same cross-sectional shape and the same cross-sectional area as those of each of the in-slot conductors, and each bridge is twisted by 90 degrees.

5. The double-stator motor according to claim 3, wherein in the inner and outer stator windings, each in-slot conductor has a rectangular cross section having the same cross-sectional area; the in-slot conductor of the inner stator winding is accommodated in each slot so that the long sides of each rectangular cross section are directed in the radial direction of the inner stator core; the in-slot conductor of the outer stator winding is accommodated in each slot so that the long sides of each rectangular cross section are directed in the circumferential direction of the outer stator core; and the in-slot conductor of the inner stator winding is accommodated in each slot so that the long sides of the rectangular cross section are directed to the radial direction of the inner stator core.

6. The double-stator motor according to claim 2, wherein in the inner and outer stator windings, each in-slot conductor has a rectangular cross section having the same cross-sectional area; the outer in-slot conductor of the outer stator winding is accommodated in each slot so that the long sides of the rectangular cross section are directed to the circumferential direction of the outer stator core; the inner in-slot conductor of the outer stator winding is accommodated in each slot so that the long sides of the rectangular cross section are directed to the radial direction of the outer stator core; and to the in-slot conductor of the inner stator winding is accommodated in each slot so that the long sides of the rectangular cross section are directed to the radial direction of the inner stator core.

7. The double-stator motor according to claim 3, wherein in the inner and outer stator windings, each in-slot conductor has a rectangular cross section having the same cross-sectional area; the outer in-slot conductor of the outer stator winding is accommodated in each slot so that the long sides of the rectangular cross section are directed to the circumferential direction of the outer stator core; the inner in-slot conductor of the outer stator winding is accommodated in each slot so that the long sides of the rectangular cross section are directed to the radial direction of the outer stator core; and the in-slot conductor of the inner stator winding is accommodated in each slot so that the long sides of the rectangular cross section are directed to the radial direction of the inner stator core.

8. The double-stator motor according to claim 2, wherein in the inner and outer stator windings, the in-slot conductor of the inner stator winding is connected to respective inner in-slot conductors of the outer stator winding via respective bridges by forming a U-shape on one axial end side; the inner and outer in-slot conductor of the outer stator winding is connected by forming a U-shape on the other axial end side, thereby form serial windings in a serpentine shape; and a plurality of the serial windings form one-phase of winding component as a whole.

9. The double-stator motor according to claim 1, wherein each segment of the rotor is provided with slits which are radially located between inner and outer peripheral sides of the rotor.

10. The double-stator motor according to claim 2, wherein each segment of the rotor is provided with slits which are radially located between inner and outer peripheral sides of the rotor.

11. The double-stator motor according to claim 3, wherein each segment of the rotor is provided with slits which are radially located between inner and outer peripheral sides of the rotor.

12. The double-stator motor according to claim 4, wherein each segment of the rotor is provided with slits which are radially located between inner and outer peripheral sides of the rotor.

13. The double-stator motor according to claim 5, wherein each segment of the rotor is provided with slits which are radially located between inner and outer peripheral sides of the rotor.

14. The double-stator motor according to claim 6, wherein each segment of the rotor is provided with slits which are radially located between inner and outer peripheral sides of the rotor.

15. The double-stator motor according to claim 7, wherein each segment of the rotor is provided with slits which are radially located between inner and outer peripheral sides of the rotor.

16. The double-stator motor according to claim 8, wherein each segment of the rotor is provided with slits which are radially located between inner and outer peripheral sides of the rotor.

\* \* \* \* \*